No. 612,564. Patented Oct. 18, 1898.
W. E. GILBERT.
REVOLVING CHAIN COVER AND GEAR CASE.
(Application filed June 20, 1898.)
(No Model.)
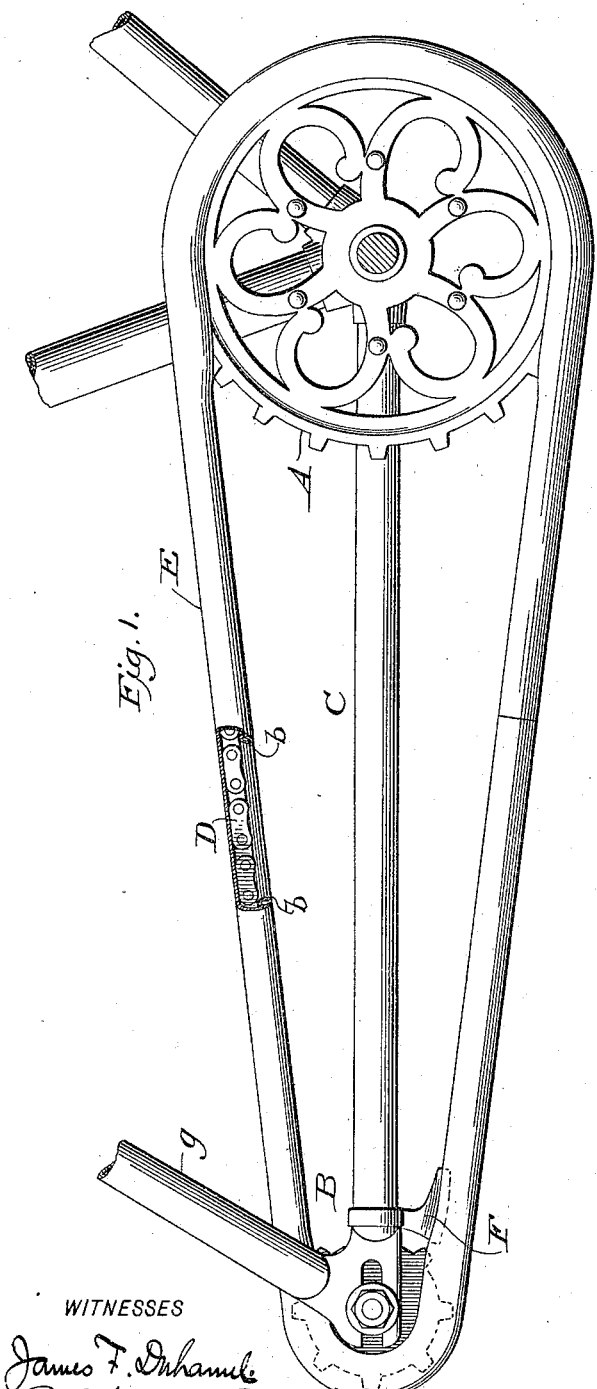
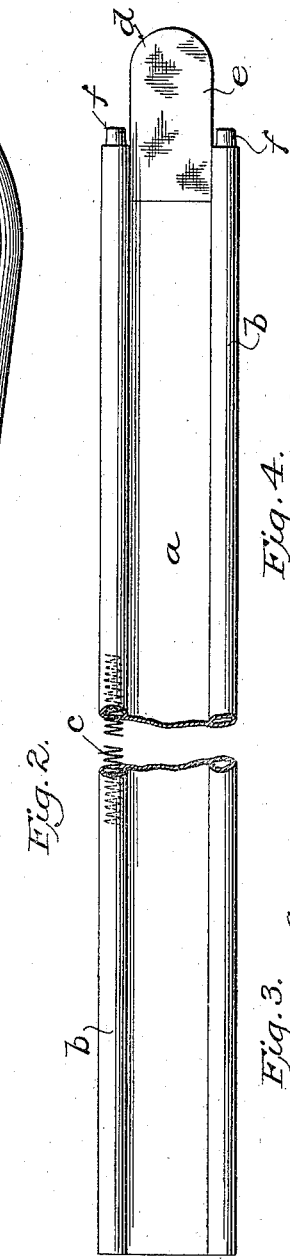
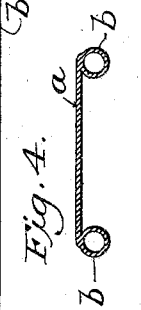
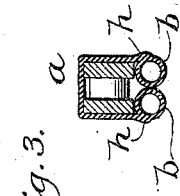
WITNESSES
INVENTOR
BY
his ATTORNEY
THE NORRIS PETERS CO., PHOTO-LITHO., WASHINGTON, D. C.

UNITED STATES PATENT OFFICE.

WILLIAM E. GILBERT, OF NEW YORK, N. Y.

REVOLVING CHAIN-COVER AND GEAR-CASE.

SPECIFICATION forming part of Letters Patent No. 612,564, dated October 18, 1898.

Application filed June 20, 1898. Serial No. 683,912. (No model.)

*To all whom it may concern:*

Be it known that I, WILLIAM E. GILBERT, a citizen of the United States, and a resident of New York city, in the county of New York and State of New York, have invented certain new and useful Improvements in Revolving Chain-Covers and Gear-Cases, of which the following is a specification.

My present invention relates to revolving chain-covers and gear-cases, particularly designed for use of driving-chains and sprocket-wheels of cycles, but which may be used in other relations and upon other machines or devices.
One object of my invention is to produce a chain-cover and gear-case of flexible and elastic material which may be slightly stretched over the chain and sprocket-wheel so as to exert just sufficient frictional contact with the chain to revolve therewith around the sprocket-wheels.

Another object is to produce a device of this character which will be light in weight and inexpensive to manufacture, which will closely envelop the upper and lower lines of the chain between the sprocket-wheels, and which will close tightly at the edges to keep dust and dirt out of the chain without the use of clips or clasps to pinch the edges together.

In its broadest aspect my invention contemplates a chain-cover and gear-casing having hollow tubes upon its outer edges, said tubes being filled with air or some fluid or liquid either under pressure or at normal pressure, or said tubes may have a spiral spring embedded therein for a purpose to be hereinafter described. With such a chain-cover and gear-case applied to a chain and sprocket-wheels of a cycle the tubes in running around the sprockets are compressed at the sprocket-wheel, and the air, fluid, or liquid is thus forced by pressure into the tubes at the upper and lower lines of the chain between the sprockets, thus closing the tubes together at those points with a gentle and elastic pressure to exclude dust and dirt, but to yield sufficiently to prevent abrasion or "running in" at the points where the sprocket-teeth enter between the tubes. I have also devised simple and efficient means for connecting the ends of the cover, said means permitting the cover to be cut off or shortened to fit the varying lengths of chains and cycles of sprocket-wheels without affecting the fastenings or requiring readjustment thereof. I attain these objects and advantages by means of the construction shown in the accompanying drawings, which form part of this specification, and in which—

Figure 1 is a side view of the sprocket-wheels and contiguous parts of a cycle-gearing, showing my chain-cover and gear-case applied to the chain and sprockets, said cover being broken away at a portion of the upper line of the chain to show the position which the chain assumes within the cover. Fig. 2 is a plan view of my chain-cover prior to its attachment to the chain and sprockets and prior to the ends being fastened together, and showing the cover broken away in the center to illustrate the manner in which a spiral spring may be inclosed within the tubes, if desired. Fig. 3 shows a vertical section of one line of the chain having the cover stretched over it and the edge tubes in contact with each other. Fig. 4 is a cross-section through the cover and edge tubes before being stretched over the chain and sprocket.

Like letters refer to like parts wherever they occur in the various figures in the drawings.

Referring to Fig. 1, A is the large or main sprocket-wheel, and B the rear or small sprocket-wheel, of an ordinary or well-known bicycle.

C is the horizontal tube, extending from one sprocket-wheel to the other.

D is the drive-chain, which passes over the sprocket-wheels in the usual manner.

E is my improved chain-cover and gear-case, which, as shown in Figs. 2 and 4, consists of a rubber band *a* of proper thickness and elasticity. Upon the outer edges of this band *a* are tubes *b*, which may be either molded or subsequently united thereto. For some purposes I may find it desirable to inclose or embed within these tubes from end to end a spiral spring *c*, said spring being made of either wire or similar resilient material of the desired gage or strength to prevent the tubes from collapsing too easily. At one end of the band *a* a projecting tab *d* is provided, and secured to one surface of this tab is a layer or piece of textile fabric *e*, secured thereto by cement or similar means. The end of the tubes $b$ at the sides of the tab are reduced in size, as at $f$, and said reduced ends may be covered with inelastic textile fabric.

When it is desired to secure my cover in position upon a chain and sprocket-wheel, the desired length of cover is first determined, and if the cover is longer than is necessary the left-hand end, as shown in Fig. 2, may be cut off the required distance to precisely fit the chain to the cover. It will be understood, of course, that the cover, as shown in Fig. 2, will be made of a length greater than is required for ordinary use or as long as the longest chain and largest sprocket-wheels will require, and hence may be shortened for shorter chains and smaller sprockets to suit the convenience of the purchaser. When cut the desired length, cement is applied to the tab $d$ and to the reduced ends $f$ of the tubes, and after the cover has been applied to the chain and sprockets, or, rather, after the cover has been passed behind the fork-tube $g$, Fig. 1, the tab $d$ is connected to the opposite end of the band, and the reduced ends $f$ are inserted within the opposite ends of the tubes, and the cement or other adhesive is permitted to dry and set to hold the ends together. The fabric $e$ and the fabric surrounding the reduced portions or nipples $f$ being inelastic will not permit the ends when united to be separated by stretching the cover cover over the chain.

When the cover is revolving with the chain and sprockets, the tubes $b$, where they pass over the sprockets, are somewhat compressed, and this compression causes a corresponding inflation of the tubes between the sprocket-wheels, and thus the tubes are forced together to cover the chain and entirely envelop it.

Upon referring to Fig. 3 it will be seen that the band $a$ at its edges, where it is united to the tubes or molded therewith, is slightly enlarged, as at $h$, and this rib or reinforce serves to sustain the air, fluid, liquid, or spiral spring $c$ against outward pressure, and thus insure contact of the inner surfaces of the tubes immediately after passing out of contact with the sprocket-wheel.

I may find it desirable for use with certain kinds of cycles to apply a plow or opener F at the lower lines of the chain just in front of the rear or small sprocket-wheel; but for nearly all of the wheels in common use this device is not found necessary or desirable.

It will be understood, of course, that the tubes $b$ may contain air under ordinary atmospheric pressure, or they may be inflated by means of a pneumatic needle or pump, or they may contain liquid, fluid, or a spring.

It will be understood that the cover in its normal condition before being stretched upon the chain is somewhat wider between the tubes and the tubes $b$ are somewhat larger than when applied to the chain and sprocket-wheel, and this difference in condition makes the cover assume the position shown in Figs. 1 and 3.

Without desiring to be limited to the exact construction shown, as I am aware that many changes may be made without departing from the spirit and scope of my invention, what I desire to secure by Letters Patent and claim is—

1. A revolving chain-cover and gear-case consisting of an elastic band having an elastic tube attached at each edge thereof for the purpose described.

2. A chain-cover comprising a band of elastic and flexible material having pneumatic tubes at its edges and fastening means at its ends.

3. A cover for cycle-chains consisting of a flat rubber band, pneumatic edge tubes and fastening means for its ends said fastening means consisting of end nipples on the tubes and a projecting tab on the band, substantially as described.

4. An elastic and flexible chain-cover provided with tubular edges and one plain end, the opposite end of the band having a tab covered with fabric, the tubes being reduced in size at the sides of the tab to form nipples, and covered with textile fabric said nipples to be cemented into the opposite ends of the tubes and the tab to be united to the opposite end of the band, substantially as described.

5. A chain-cover comprising a plain flat elastic band reinforced with tubular edges and fastening means at its ends, said cover designed to be stretched over the chain to revolve therewith over the sprockets substantially as described.

Signed at New York city, in the county of New York and State of New York, this 16th day of June, A. D. 1898.

WILLIAM E. GILBERT.

Witnesses:
A. F. HOOD,
P. J. FISHER, Jr.